US011005374B2

(12) United States Patent
Lam et al.

(10) Patent No.: US 11,005,374 B2
(45) Date of Patent: May 11, 2021

(54) SYSTEM AND METHOD TO ENHANCE SIGNAL TO NOISE RATIO AND TO ACHIEVE MINIMUM DUTY CYCLE RESOLUTION FOR PEAK CURRENT MODE CONTROL SCHEME

(71) Applicant: Crane Electronics, Inc., Redmond, WA (US)

(72) Inventors: Cuon Lam, Renton, WA (US); Sovann Song, Kent, WA (US); Leslie Khauv, Redmond, WA (US); Mikel Thomas, Kirkland, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days.

(21) Appl. No.: 16/446,298

(22) Filed: Jun. 19, 2019

(65) Prior Publication Data
US 2020/0403498 A1 Dec. 24, 2020

(51) Int. Cl.
*H02M 3/335* (2006.01)
*H02M 1/42* (2007.01)
(Continued)

(52) U.S. Cl.
CPC ....... *H02M 3/33507* (2013.01); *H02M 1/143* (2013.01); *H02M 1/4225* (2013.01);
(Continued)

(58) Field of Classification Search
CPC .......... H02M 1/14; H02M 1/146; H02M 1/15; H02M 1/4225; H02M 1/143; H02M 1/088;
(Continued)

(56) References Cited

U.S. PATENT DOCUMENTS 7,119,499 B2 * 10/2006 Ishigaki ............... H05B 41/282
315/291
9,041,379 B2 * 5/2015 Lyons ............... H05B 33/0815
323/288
(Continued)

FOREIGN PATENT DOCUMENTS

CN 103414318 A 11/2013
CN 107453625 A 12/2017
(Continued)

OTHER PUBLICATIONS

Supertex inc., "Expected Voltages and Waveforms from an HV9120-Controlled Flyback Converter." Application Note AN-H24, Doc. No. DSAN-AN-H24, 2013, 4 pages.
(Continued)

*Primary Examiner* — Thienvu V Tran
*Assistant Examiner* — Carlos O Rivera-Perez
(74) *Attorney, Agent, or Firm* — Seed Intellectual Property Law Group LLP

(57) ABSTRACT

Systems and methods for providing peak current mode control (PCMC) for power converters. Noise immunity is improved by enhancing the signal-to-noise ratio of an inductor (or switch) current to achieve minimum duty cycle resolution and eliminate subharmonic operation that causes high input and output ripples. Current is sensed and translated to a voltage by a current sense resistor for peak current mode control scheme. A direct current (DC) offset voltage is added only during an on-time of the main switch to increase the signal-to-noise ratio. A leading-edge spike caused by turn-on of the main switch is removed by resetting a filter capacitor of a current sense circuit to zero volts after each switching cycle.

15 Claims, 6 Drawing Sheets

(51) Int. Cl.
    *H02M 1/14*     (2006.01)
    *H02M 3/158*    (2006.01)
    *H02M 1/00*     (2006.01)

(52) U.S. Cl.
    CPC ..... *H02M 3/1582* (2013.01); *H02M 3/33592* (2013.01); *H02M 2001/0009* (2013.01); *H02M 2001/0038* (2013.01)

(58) Field of Classification Search
    CPC ............ H02M 3/00; H02M 3/22; H02M 3/24; H02M 3/28; H02M 3/325; H02M 3/335; H02M 3/33507; H02M 3/33515; H02M 3/33523; H02M 3/3353; H02M 3/33538; H02M 3/33546; H02M 3/33553; H02M 3/33569; H02M 3/33576; H02M 3/33592; H02M 3/1582; H02M 3/02; H02M 3/04; H02M 3/10; H02M 3/145; H02M 3/155; H02M 3/156; H02M 3/157; H02M 3/158; H02M 3/1588; H02M 2001/0009; H02M 2001/0012; H02M 2001/0025; H02M 2001/0038; H02M 2001/0003; G05F 1/565; G05F 1/573; Y02B 70/1466; Y02B 70/1475
    USPC ................ 323/265, 271–278, 280–288, 351; 363/15–21.18, 40–43, 74–79, 89, 95–99, 363/123, 131–139
    See application file for complete search history.

(56) References Cited

U.S. PATENT DOCUMENTS

| | | | |
|---|---|---|---|
| 9,071,147 B2 | 6/2015 | Feng et al. | |
| 9,627,982 B2 | 4/2017 | Lin et al. | |
| 2003/0031035 A1* | 2/2003 | Kitano | H02M 1/12 363/49 |
| 2003/0048644 A1* | 3/2003 | Nagai | H02M 3/33592 363/21.09 |
| 2009/0134859 A1* | 5/2009 | Shiroyama | H02M 3/33507 323/282 |
| 2014/0252990 A1 | 9/2014 | Maru et al. | |

FOREIGN PATENT DOCUMENTS

| | | |
|---|---|---|
| TW | 201132236 A | 9/2011 |
| TW | 201910786 A | 3/2019 |

OTHER PUBLICATIONS

Freddy Alferink, "Current transformers," published online Oct. 6, 2013, downloaded from https://meettechniek.info/instruments/current-transformer.html on Jun. 21, 2019, 7 pages.

Texas Instruments, "LM25037/-Q1 Dual-Mode PWM Controller With Alternating Outputs", Jul. 2008—Revised Jan. 2016, 39 pages.

* cited by examiner

US 11,005,374 B2

SYSTEM AND METHOD TO ENHANCE SIGNAL TO NOISE RATIO AND TO ACHIEVE MINIMUM DUTY CYCLE RESOLUTION FOR PEAK CURRENT MODE CONTROL SCHEME

BACKGROUND

Technical Field

The present disclosure generally relates to controllers for power converters.

Description of the Related Art

DC/DC converters are a type of power supply which converts an input DC voltage to a different output DC voltage. Such converters typically include a transformer that is electrically coupled via a switching circuit between a voltage source and a load. Converters may include at least one main switch connected between the voltage source and the primary winding of the transformer to provide power transfer to the secondary winding of the transformer. A metal oxide semiconductor field effect transistor (MOSFET) device is typically used for the one or more main switches.

The peak current mode control scheme for power converters operates by comparing the positive slope of an inductor current (e.g., primary winding of a transformer), or a switch current, to an error signal that is used to program the current level. Once the current reaches the required level during each switching cycle, the switch is turned off. In practice, the current level is very small compared to the error signal, especially at minimum load and maximum line. This very low level is susceptible to a noise spike (i.e., poor signal-to-noise ratio) induced by reflected Schottky diodes capacitance and transformer winding capacitance. This spike is induced whenever the switch is turned on each cycle. If the spike has sufficient amplitude, then the spike may undesirably cause premature termination of the switch and may cause oscillation.

FIG. 1 shows portions of a conventional power converter 10 that includes a current sensing resistor $R_{CS}$ used to provide a current signal to a peak current mode control (PCMC) controller 12. The power converter includes an input voltage source Vin, a primary winding or inductor $PW_1$ a main switch Q1, and the current sense resistor $R_{CS}$. The current sense resistor $R_{CS}$ is coupled to a current sense input node or pin CS of the PCMC controller 12 via a filter resistor Rf and a filter capacitor Cf. The PCMC controller 12 includes a main switch control output node or pin OUT that is coupled to the gate of the main switch Q1 to control the operation of the main switch.

FIG. 1 shows a graph 15 of the voltage at a node 14, which is the voltage across the current sense resistor $R_{CS}$ that is proportional to the current through the primary winding $PW_1$ and the main switch Q1. As shown, there is a leading edge spike 13 that is caused by the turn-on of the main switch Q1. The signal is filtered by the filter resistor Rf and the filter capacitor Cf and provided to the current sense pin CS of the PCMC controller. A graph 17 shown in FIG. 1 shows an idealized waveform at a node 16.

In practice, the spike 13 cannot be fully filtered by the filter resistor Rf and the filter capacitor Cf. FIG. 2 shows a graph 20 of the voltage 22 at node 16 of FIG. 1 during a high load and low line condition (left), during a medium load and medium line condition (middle), and during a minimum load and maximum line condition (right). As can be seen, spikes 24 caused by the turn-on of the main switch Q1 dominate the actual current level (sloped signal 26) at maximum line and minimum load conditions.

Thus, there is a need to increase the signal-to-noise ratio and reduce or eliminate the leading-edge spike in all operating conditions, which helps eliminate unintended pulse skipping caused by poor noise immunity.

BRIEF SUMMARY

A current sense circuit for a peak current mode control (PCMC) controller of a power converter, the power converter including a main switch that includes a main switch control node, and the PCMC controller including a control output electrically coupled to the main switch control node to control the operation of the main switch and a current sense input node to receive a current signal indicative of a current of the main switch, may be summarized as including a current sense resistor electrically coupled in series with the main switch; a filter resistor comprising a first terminal and a second terminal, the first terminal electrically coupled to a node between the current sense resistor and the main switch, and the second terminal electrically coupled to the current sense input node; a filter capacitor electrically coupled to the current sense input node; and a main switch control node resistor comprising a first terminal and a second terminal, the first terminal electrically coupled to the main switch control node, and the second terminal electrically coupled to the current sense input node. The main switch may include a MOSFET switch, and the first terminal of the main switch control node resistor may be electrically coupled to the gate of the MOSFET switch. The main switch may include an N-channel MOSFET switch, and the first terminal of the main switch control node resistor may be electrically coupled to the gate of the N-channel MOSFET switch.

A peak current mode control (PCMC) controller for a power converter, the power converter including a main transformer having a primary winding and a secondary winding, the primary winding electrically coupleable to an input voltage node and electrically coupled to a main switch, the secondary winding electrically coupleable to an output voltage node, may be summarized as including a control output node electrically coupled to a main switch control node of the main switch to control the operation of the main switch; a current sense input node to receive a current signal indicative of a current of the main switch; and a current sense circuit, including a current sense resistor electrically coupled in series with the main switch; a filter resistor comprising a first terminal and a second terminal, the first terminal electrically coupled to a node between the current sense resistor and the main switch, and the second terminal electrically coupled to the current sense input node; a filter capacitor electrically coupled to the current sense input node; and a main switch control node resistor comprising a first terminal and a second terminal, the first terminal electrically coupled to the main switch control node, and the second terminal electrically coupled to the current sense input node. The PCMC controller may utilize pulse width modulation (PWM) control.

A power converter may be summarized as including a transformer having a primary winding and a secondary winding, the primary winding electrically coupleable to an input voltage node and the secondary winding electrically coupleable to an output voltage node; a primary circuit electrically coupled to the primary winding, the primary circuit comprising a main switch; a peak current mode control (PCMC) controller, including a control output node electrically coupled to a main switch control node of the main switch to control the operation of the main switch; a current sense input node to receive a current signal indicative of a current of the main switch; and a current sense circuit, including a current sense resistor electrically coupled in series with the main switch; a filter resistor comprising a first terminal and a second terminal, the first terminal electrically coupled to a node between the current sense resistor and the main switch, and the second terminal electrically coupled to the current sense input node; a filter capacitor electrically coupled to the current sense input node; and a main switch control node resistor comprising a first terminal and a second terminal, the first terminal electrically coupled to the main switch control node, and the second terminal electrically coupled to the current sense input node.

The power converter may be a flyback converter. The power converter may be a forward converter. The power converter may be a hybrid DC-DC converter or a DC-DC converter built on a printed circuit board (PCB). The power converter may be a boost converter. The power converter may be a buck converter. The power converter may be an isolated power converter. The power converter may be a non-isolated power converter. The main switch may include a MOSFET switch, and the first terminal of the main switch control node resistor may be electrically coupled to the gate of the MOSFET switch. The main switch may include an N-channel MOSFET switch, and the first terminal of the main switch control node resistor may be electrically coupled to the gate of the N-channel MOSFET switch.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide peak current mode control (PCMC) circuitry for power converters. As discussed further below with reference to the figures, one or more implementations of the present disclosure provide systems and methods to increase the signal-to-noise ratio and reduce or eliminate the leading-edge spikes in a current sense signal in all operating conditions. The features discussed herein allow the signal at the current sense node or pin of a PCMC controller to be much closer to an ideal waveform and help to eliminate unintended pulse skipping caused by poor noise immunity. The features discussed herein may be used in any type of power converter that implements a PCMC control scheme.

Figure 4:
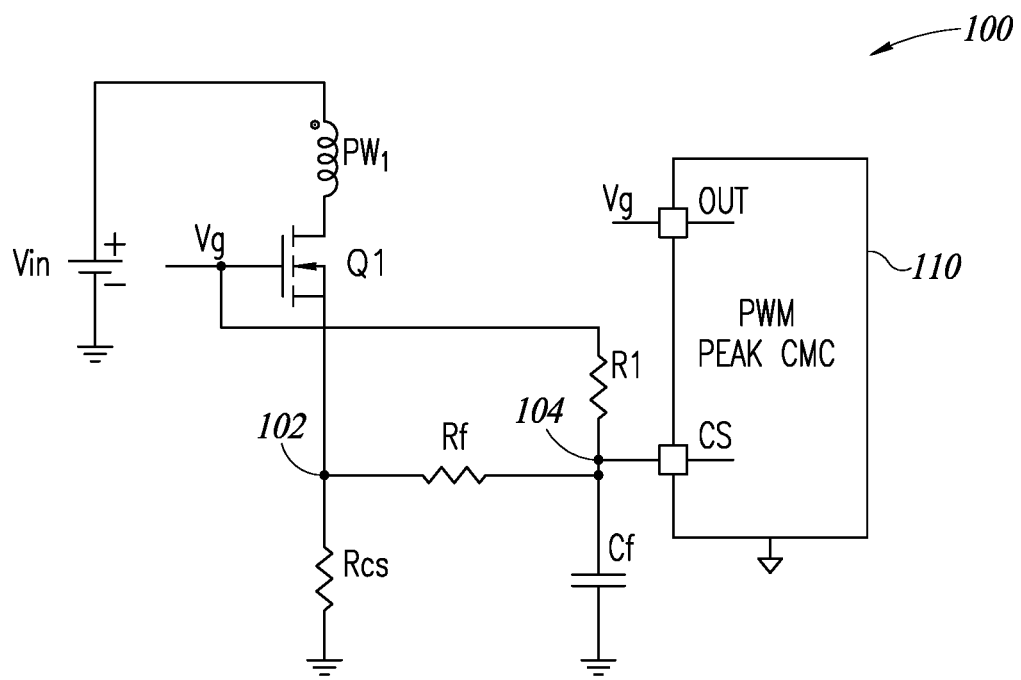
FIG. 4 is a schematic circuit diagram of a power converter that implements a PCMC control scheme, according to one non-limiting illustrated implementation.

FIG. 4 shows a schematic diagram for a portion of power converter 100 that utilizes a PCMC controller 110 according to an example implementation of the present disclosure. In the illustrated implementation, the power converter 100 may be a flyback converter. However, it should be appreciated that the PCMC controller 110 may be used with other types of power converters (e.g., forward converter) as well. The power converter 100 includes the PCMC controller or control circuitry 110, and includes a current sensing resistor $R_{CS}$ used to provide a current signal at a node 102 to the peak current mode control (PCMC) controller. The power converter 100 includes a DC input voltage source Vin, a primary winding or inductor $PW_1$, a main switch Q1, and the current sense resistor $R_{CS}$. The current sense resistor $R_{CS}$ is coupled to a current sense input node or pin CS of the PCMC controller 110 at a node 104 via a filter resistor Rf and a filter capacitor Cf. The PCMC controller 110 includes a main switch control output node or pin OUT that is coupled to the gate of the main switch Q1 to control the operation of the main switch. In the illustrated example, the main switch Q1 is an N-channel MOSFET switch, but other suitable types of switches may be used in other implementations. The secondary side of the power converter 100 is not shown in FIG. 4 for simplification.

In the implementation of FIG. 4, a main switch control node resistor R1 is electrically coupled between the gate of the switch Q1 and the current sense input node CS. A DC-offset voltage at the node 104 is provided by a voltage divider formed by the filter resistor Rf and the resistor R1 multiplied by the voltage Vg at the gate of the main switch Q1. Advantageously, the DC-offset voltage is added only during the on-time of the gate signal Vg driving the main switch Q1. Since the gate signal Vg has an on-time and an off-time each switching cycle, the voltage at the node 104 is reset to 0 volts before each turn-on cycle. This feature maximizes the ability of the filter capacitor Cf to absorb the spike caused by turning on the switch Q1, which has the effect of eliminating the spike in all operating conditions.

Figure 5:
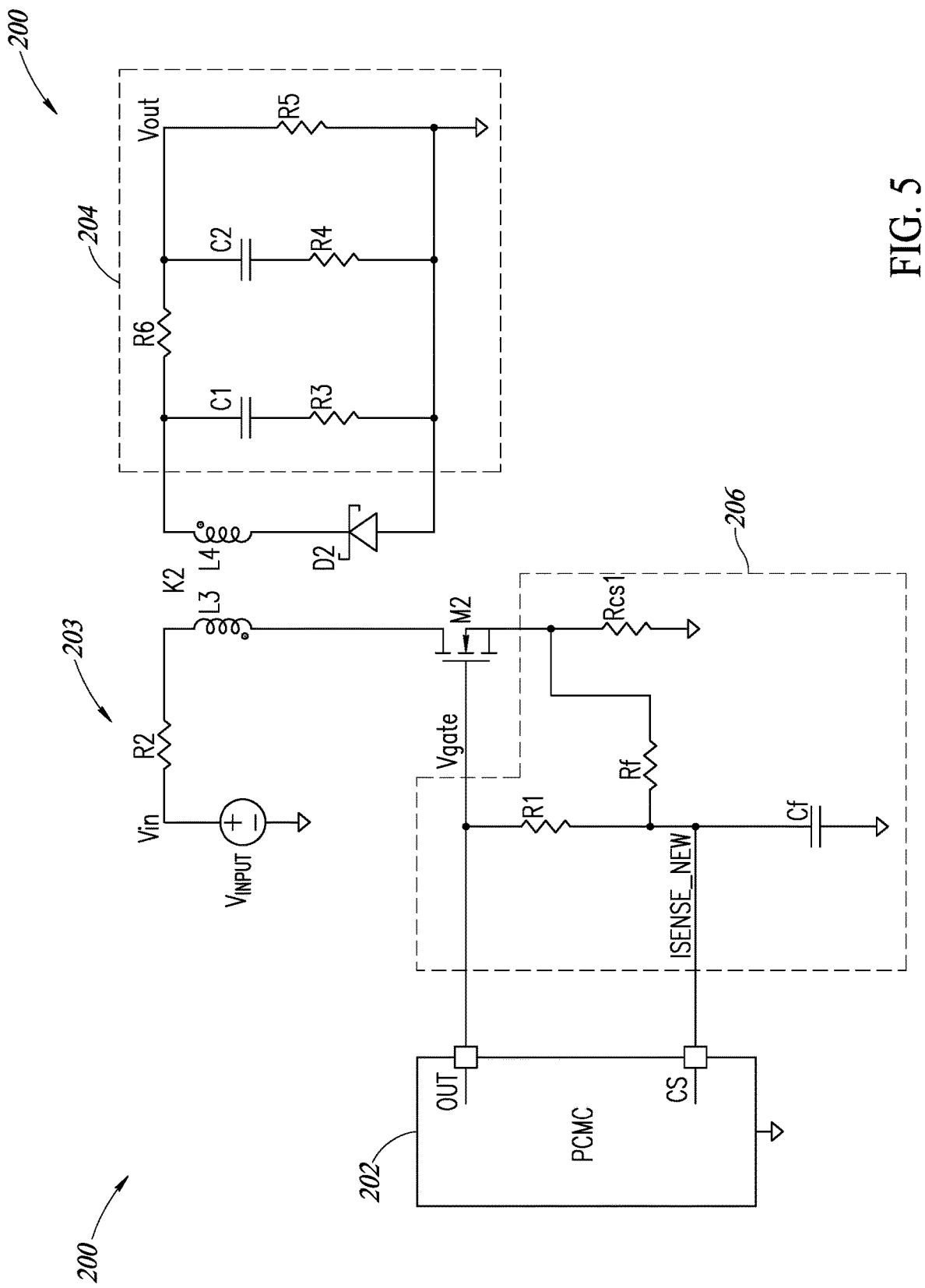
FIG. 5 is a schematic circuit diagram of a power converter that implements a PCMC control scheme, according to one non-limiting illustrated implementation.

FIG. 5 shows a schematic diagram for a power converter 200 that utilizes a PCMC controller 202 and a current sense circuit 206 according to an example implementation of the present disclosure. In the illustrated implementation, the power converter 200 is a flyback converter. However, it should be appreciated that the PCMC controller 202 may be used with other types of power converters as well. Generally, the power converter 200 includes the PCMC controller or control circuitry 202, the current sense circuit 206 a primary side circuit 203, and an isolated secondary side circuit 204.

In the example power converter 200 of FIG. 5, a DC voltage input $V_{INPUT}$ that provides an input voltage Vin via an input resistor R2 is connected to a primary winding L3 of a transformer K1 by a primary or main switch M2. In the illustrated implementation, the switch M2 is an N-channel MOSFET device.

A secondary winding L4 of the transformer K1 is connected to an output lead $V_{OUT}$ through a rectifying Schottky diode D2. With the main power switch M2 conducting, the input voltage Vin is applied across the primary winding L3. The secondary winding L4 is oriented in polarity to respond to the primary voltage with a current flow through a load, represented by a resistor R5, connected to the output lead Vout, and back through the diode D2 to the secondary winding L4. One or more output capacitors and resistors (e.g., resistors R3, R4, and R6 and capacitors C1 and C2) may also be provided.

The PCMC controller 202 may include an output control node OUT which provides a PWM drive signal Vgate having a duty cycle D to the control node or gate of the main switch M2.

The current sense circuit 206 is operative to sense the current through the main switch M2 and inductor L3 of the power converter 200. The current sense circuit 206 may provide a feedback signal (or control signal) to the PCMC controller 202 at a current sense input node or pin CS of the PCMC controller, as discussed elsewhere herein.

The current sense circuit 206 may be similar or identical to the current sense circuit shown in FIG. 4. In this example, the current sense circuit 206 includes a current sensing resistor Rcs1 used to provide a current signal to the PCMC controller 202 of the power converter 200. The current sense resistor Rcs1 is coupled to a current sense input node or pin CS of the PCMC controller 202 at a node ISENSE_NEW via a filter resistor Rf and a filter capacitor Cf. A main switch control node resistor R1 is electrically coupled between the gate of the switch M2 and the current sense input CS at the node ISENSE_NEW.

As discussed above with reference to FIG. 4, a DC-offset voltage at the node ISENSE_NEW is provided by a voltage divider formed by the filter resistor Rf and the resistor R1 multiplied by the voltage Vgate at the gate of the main switch M2. Advantageously, the DC-offset voltage is added only during the on-time of the gate signal Vgate driving the main switch M2. Since the gate signal Vgate has an on-time and an off-time each switching cycle, the voltage at the node ISENSE_NEW is reset to 0 volts before each turn-on cycle due to the filter capacitor Cf fully discharging. This feature maximizes the ability of the filter capacitor Cf to absorb the spike caused by turning on the switch M2, which eliminates the spike in all operating conditions.

For purposes of illustration, non-limiting example values for the various components of the power converter 200 are provided below. It should be appreciated that the values may be modified for various applications, and one or more components may be added or removed to achieve a desired functionality. The resistors in the power converter 200 may have the following example values: resistor R1 may be 60 kΩ, resistor R2 may be 1 mΩ, resistor R3 may be 0.005Ω, resistor R4 may be 0.01Ω, resistor R5 may be 41.5Ω, resistor R6 may be 0.033Ω, resistor Rf may be 1 kΩ, and resistor Rcs1 may be 0.2Ω. The capacitors in the power converter 200 may have the following example values: capacitor C1 may have a value of 120 μF, capacitor C2 may have a value of 10 μF, and capacitor Cf may have a value of 47 pF. The primary winding L3 of the trans former K2 may have an inductance of 12.74 μH, and the secondary winding L4 may have an inductance of 1.04 μH, for example. The input DC voltage may provide any suitable DC voltage (e.g., 50 V). The PCMC controller 202 may provide a PWM drive signal that has a low level of 0 volts and a high value of 10 volts, for example.

Figure 6:
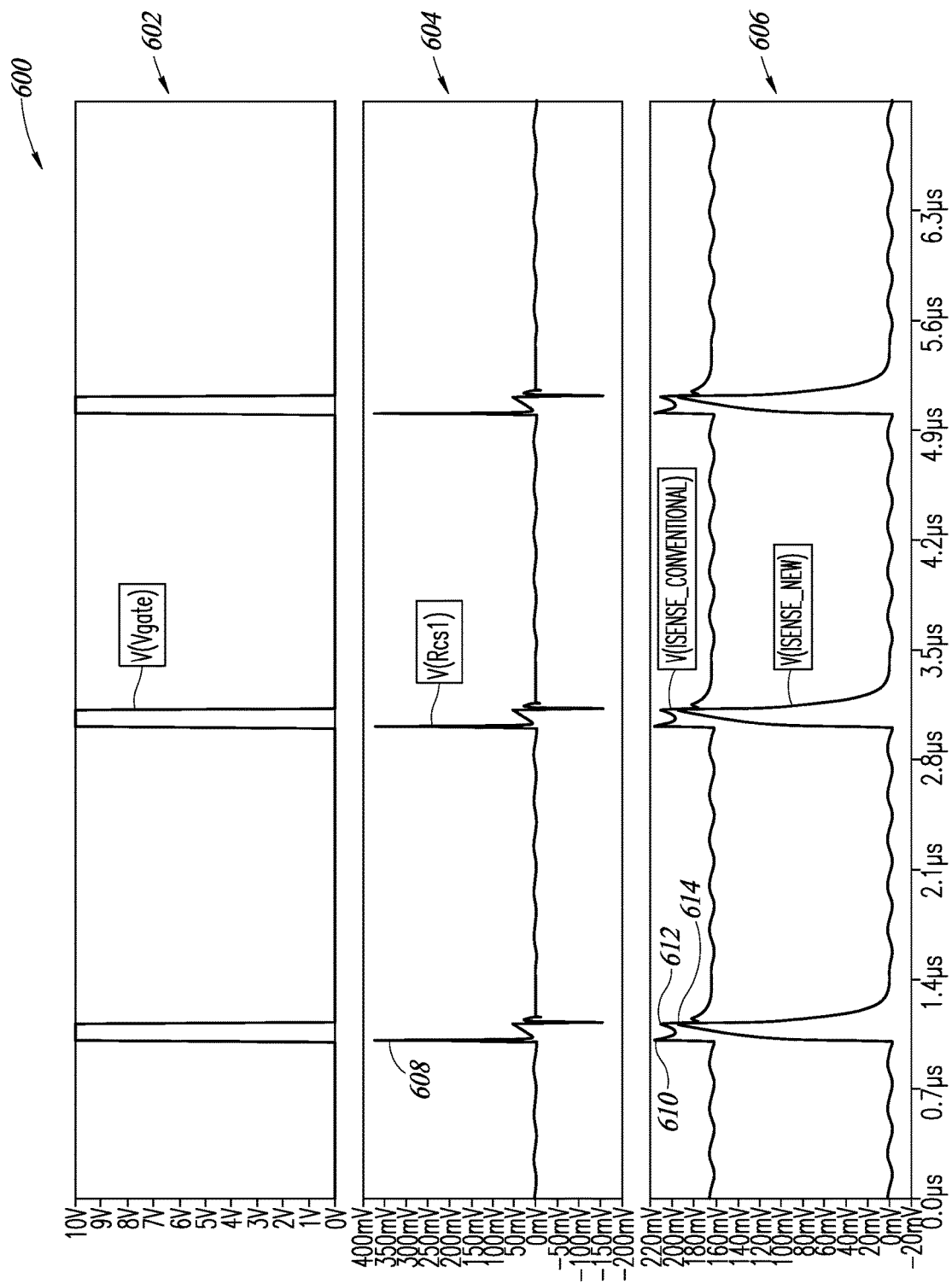
FIG. 6 is a graph showing various waveforms of the power converters of FIGS. 3 and 5 during a 10 percent of maximum load condition, according to one illustrated implementation.
Figure 7:
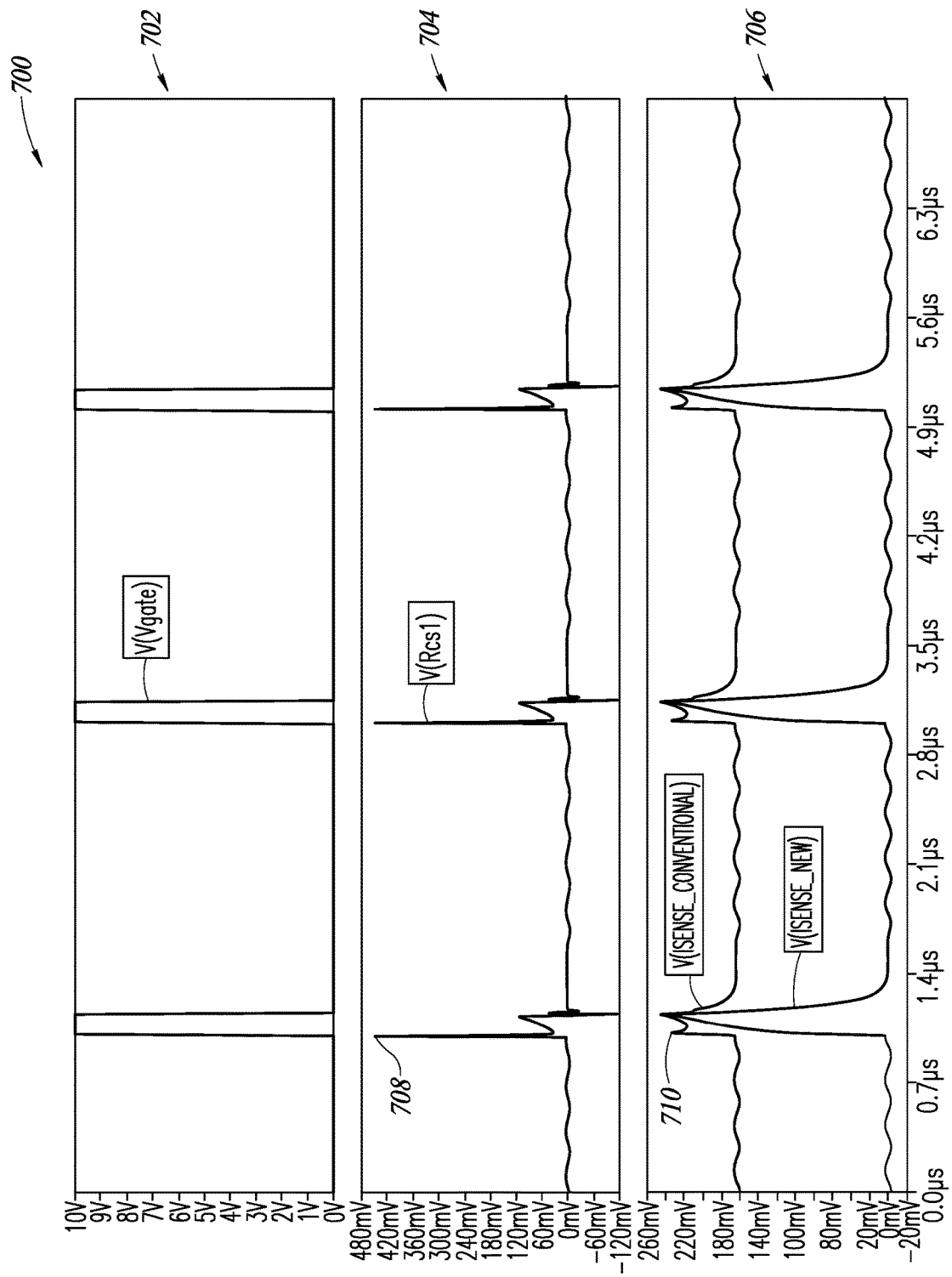
FIG. 7 is a graph showing various waveforms of the power converters of FIGS. 3 and 5 during a 50 percent of maximum load condition, according to one illustrated implementation.
Figure 8:
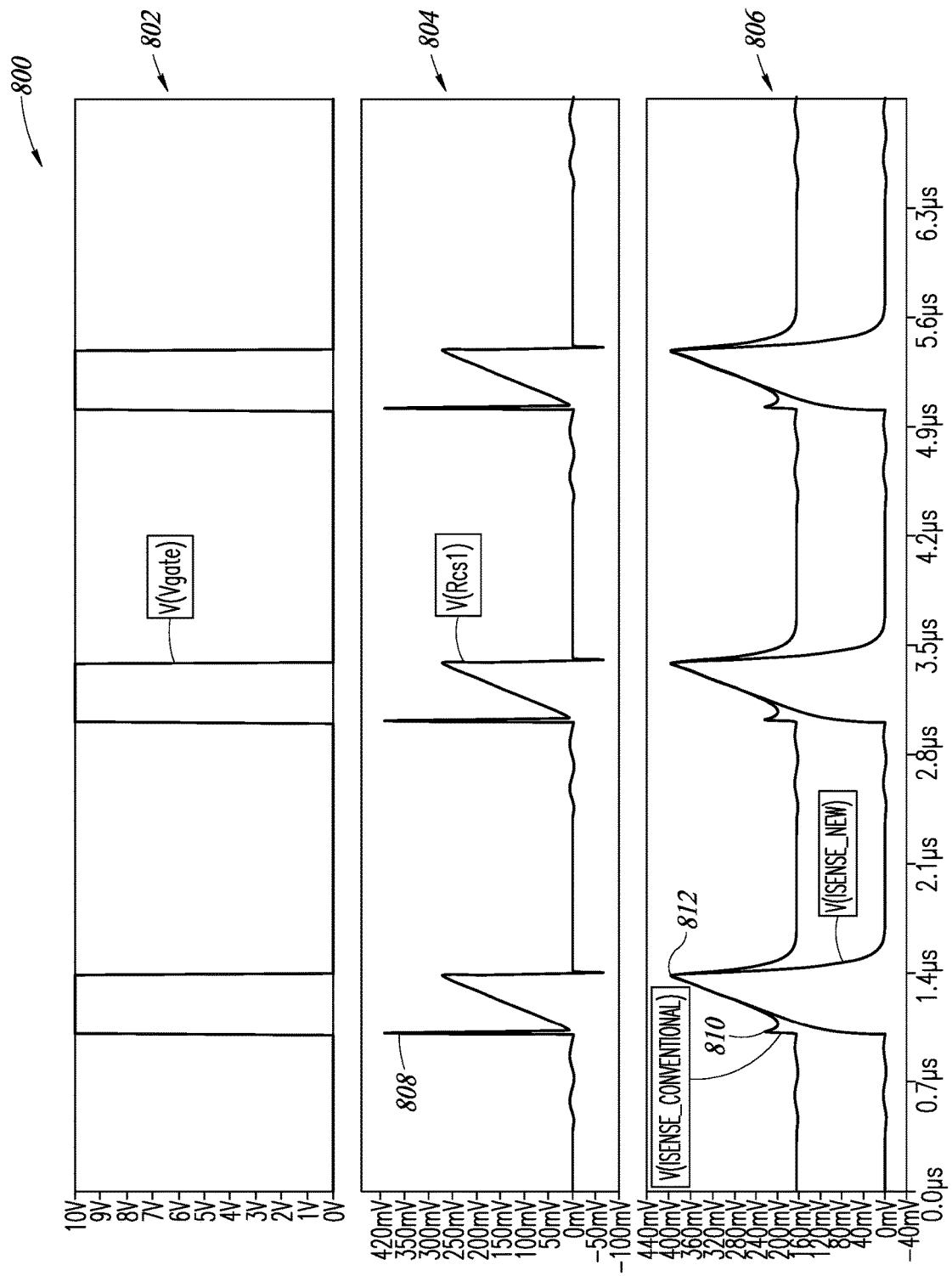
FIG. 8 is a graph showing various waveforms of the power converters of FIGS. 3 and 5 during a 100 percent of maximum load condition, according to one illustrated implementation.

FIGS. 6-8 show various waveforms for the power converter 200 of FIG. 5 at various load conditions. To provide a comparison to conventional current sense circuits, FIGS. 6-8 also include waveforms for a conventional current sense circuit 30 shown in FIG. 3. The conventional current sense circuit 30 of FIG. 3 includes a filter resistor Rf and a filter capacitor Cf that receive a current sense signal V(Rcs) (node 14) from a current sense resistor (not shown). A fixed DC-offset voltage is provided by a resistor $R_{FIXED}$ that is tied to a DC supply voltage $V_{CC}$. The output of the current sense circuit 30, labeled ISENSE_CONVENTIONAL (node 16) is provided to a current sense input node CS of the PCMC controller 12. In this non-limiting example of the current sense circuit 30, the resistor Rf may have a value of 1 k, the resistor $R_{FIXED}$ may have a value of 60 kΩ, the filter capacitor Cf may have a value of 47 pF, and $V_{CC}$ may provide a fixed voltage of 10 V. Thus, the fixed DC-offset voltage is 0.164 V (i.e., 1 kΩ/(60 kΩ+1 kΩ)×10 V).

Figure 1:
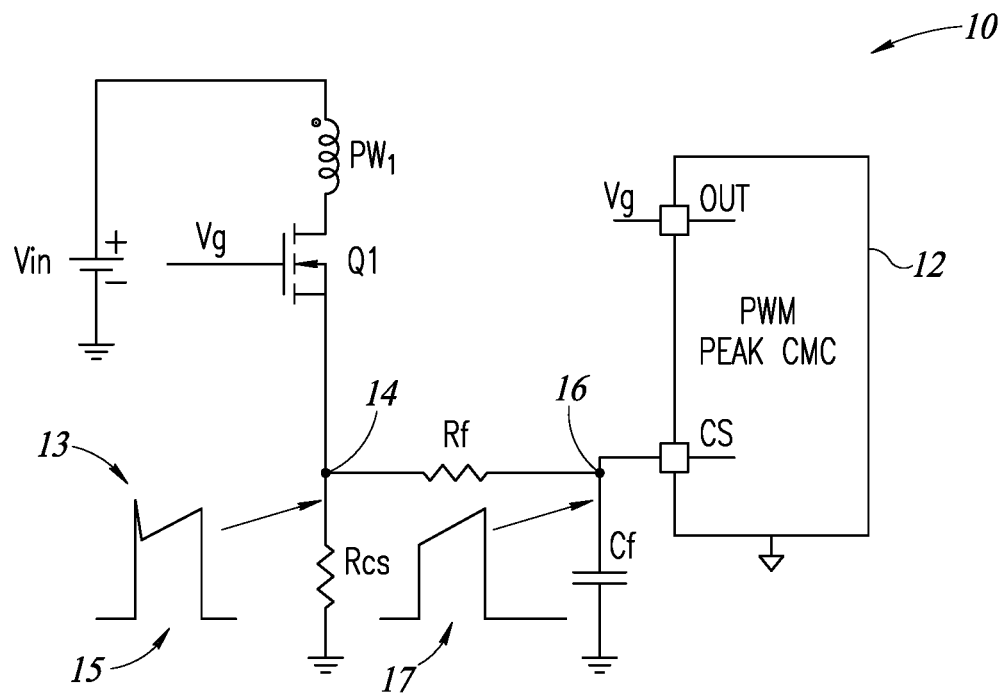
FIG. 1 is a schematic circuit diagram of a portion of a conventional power converter that implements a peak current mode control (PCMC) control scheme.
Figure 2:
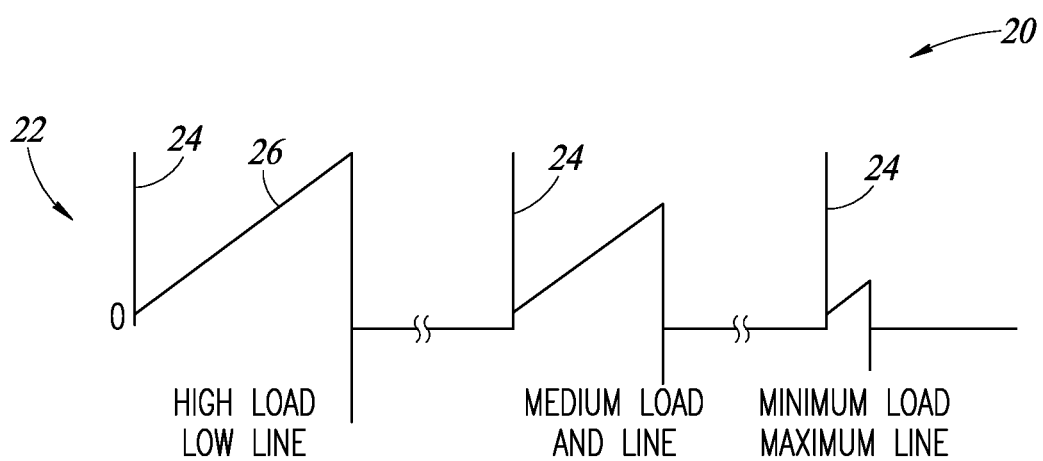
FIG. 2 is a graph that shows a current sense signal for a conventional power converter that uses a PCMC control scheme during a high load and low line condition (left), during a medium load and medium line condition (middle), and during a minimum load and maximum line condition (right).
Figure 3:
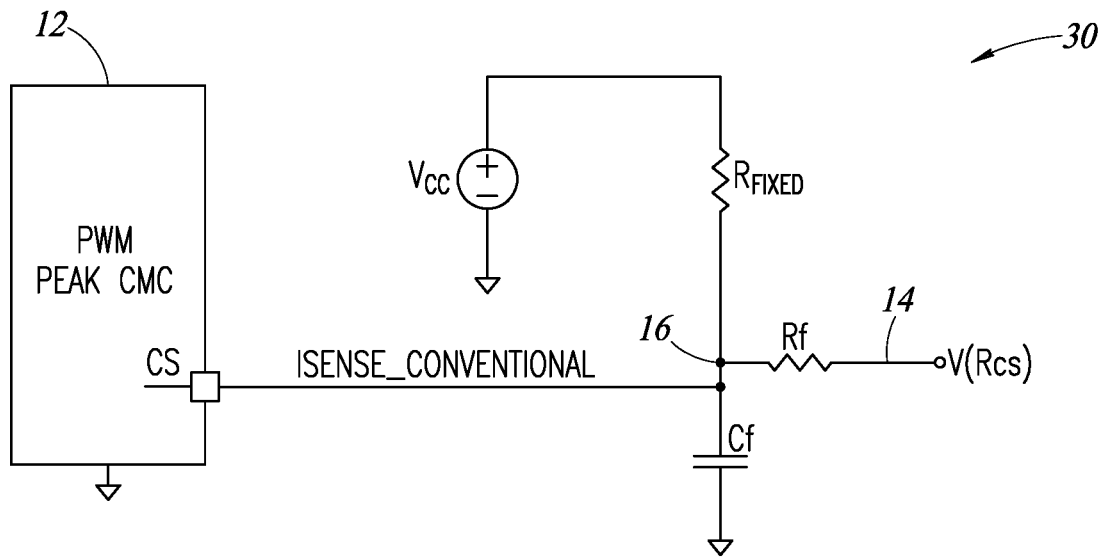
FIG. 3 is a schematic circuit diagram of a conventional current sense circuit for a power converter that implements a PCMC control scheme.

FIG. 6 is a graph 600 showing various waveforms of the power converters of FIGS. 3 and 5 during a 10 percent of maximum load condition, according to one illustrated implementation. In particular, the graph 600 includes a subgraph 602 which shows the voltage (Vgate) of the power converter 200, a subgraph 604 which shows the voltage V(Rcs1) across the sense resistor Rcs1, including a spike 608 that occurs when the main switch M2 is turned on, and a subgraph 606 which shows the voltage (ISENSE_NEW) of FIG. 5 and the voltage (ISENSE_CONVENTIONAL) of FIG. 3, which signals are provided as input to a current sense pin of a PCMC controller (e.g., controller 202 of FIG. 5, controller 12 of FIG. 3), as discussed above. As can be seen in subgraph 606, the conventional current sense circuit 30 has multiple peaks 610 and 612 while the current sense circuit 206 of FIG. 5 has only one peak 614 at the correct time. In practice, the first peak 610, which is not the true peak of an increasing current signal, may undesirably trigger termination of a switching cycle. That is, in the conventional current sense circuit 30, the correct peak 612 is ignored because the PCMC controller triggers on the initial peak 610 caused by the spike 608. In contrast, the voltage (ISENSE_NEW) only has a single correct peak 614, as shown in FIG. 6.

FIG. 7 is a graph 700 showing various waveforms of the power converters of FIGS. 3 and 5 during a 50 percent of maximum load condition, according to one illustrated implementation. In particular, the graph 700 includes a subgraph 702 which shows the voltage (Vgate) of the power converter 200, a subgraph 704 which shows the voltage V(Rcs1) across the sense resistor Rcs1, including a spike 708 that occurs when the main switch M2 is turned on, and a subgraph 706 which shows the voltage (ISENSE_NEW) of FIG. 5 and the voltage (ISENSE_CONVENTIONAL) of FIG. 3, as discussed above. As can be seen in subgraph 706, the conventional current sense circuit 30 also has an initial peak 710 due to the turn on of the main switch which may incorrectly trigger termination of a switching cycle, whereas the voltage (ISENSE_NEW) only has a single peak at the correct time point in the switching cycle.

FIG. 8 is a graph 800 showing various waveforms of the power converters of FIGS. 3 and 5 during a 100 percent of maximum load condition, according to one illustrated implementation. In particular, the graph 800 includes a subgraph 802 which shows the voltage (Vgate) of the power converter 200, a subgraph 804 which shows the voltage V(Rcs1) across the sense resistor Rcs1, including a spike 808 that occurs when the main switch M2 is turned on, and a subgraph 806 which shows the voltage (ISENSE_NEW) of FIG. 5 and the voltage (ISENSE_CONVENTIONAL) of FIG. 3, as discussed above. As can be seen in subgraph 806, the conventional current sense circuit 30 also has an initial peak 810 which may incorrectly trigger termination of a switching cycle, whereas the voltage (ISENSE_NEW) only has a single peak 812 at the correct time point. Accordingly, the current sense circuit 206 resolves the minimum duty-cycle required by providing the correct peak value. That is, there is always only "one" correct peak in all operating conditions so there is no incorrect termination of the switching cycle.

One or more implementations discussed herein provide several advantages and benefits. For example, the systems and methods described herein maintain low ripple even at maximum line and minimum load conditions. Further, the number and size of parts required to implement the features discussed herein is very low relative to other solutions such as active leading edge blanking or use of a current transformer. For example, a current transformer is not required to achieve the high level of efficiency and signal-to-noise ratio provided herein. Additionally, the DC-offset voltage at the current sense pin of the PCMC controller is only added during the on-time of the main switch, such that the voltage at the current sense pin is 0 V during the off-time of the switch. As discussed above, the filtering capacitor Cf is reset to 0 V before each turn-on cycle of the main switch, which maximizes the filtering capability of the filtering capacitor since the capacitor is able to absorb more energy than if the voltage across the capacitor were at a level above 0 V. An additional benefit provided by the systems and methods discussed herein is there is no change to the PWM gain since the slope is the same as conventional methods.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers, as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A current sense circuit for a peak current mode control (PCMC) controller of a power converter, the power converter comprising a main switch that includes a main switch control node, and the PCMC controller comprising a control output electrically coupled to the main switch control node to control the operation of the main switch and a current sense input node to receive a current signal indicative of a current of the main switch, the current sense circuit comprising:

a current sense resistor electrically coupled in series with the main switch;

a filter resistor comprising a first terminal and a second terminal, the first terminal electrically coupled to a node between the current sense resistor and the main switch, and the second terminal electrically coupled to the current sense input node;

a filter capacitor electrically coupled to the current sense input node; and a main switch control node resistor comprising a first terminal and a second terminal, the first terminal directly electrically coupled to the main switch control node, and the second terminal directly electrically coupled to the current sense input node such that, in operation, the main switch control node resistor resets the filter capacitor each time the main switch is turned off before a next turn-on cycle to maximize the ability of the filter capacitor to absorb a spike at the current sense input node caused by turning on the main switch during the next turn-on cycle.

2. The current sense circuit of claim 1 wherein the main switch comprises a MOSFET switch, and the first terminal of the main switch control node resistor is electrically coupled to the gate of the MOSFET switch.

3. The current sense circuit of claim 1 wherein the main switch comprises an N-channel MOSFET switch, and the first terminal of the main switch control node resistor is electrically coupled to the gate of the N-channel MOSFET switch.

4. A peak current mode control (PCMC) controller for a power converter, the power converter comprising a main transformer having a primary winding and a secondary winding, the primary winding electrically coupleable to an input voltage node and electrically coupled to a main switch, the secondary winding electrically coupleable to an output voltage node, the PCMC controller comprising:

a control output node electrically coupled to a main switch control node of the main switch to control the operation of the main switch;

a current sense input node to receive a current signal indicative of a current of the main switch; and a current sense circuit, comprising:
 a current sense resistor electrically coupled in series with the main switch;
 a filter resistor comprising a first terminal and a second terminal, the first terminal electrically coupled to a node between the current sense resistor and the main switch, and the second terminal electrically coupled to the current sense input node;
 a filter capacitor electrically coupled to the current sense input node; and
 a main switch control node resistor comprising a first terminal and a second terminal, the first terminal directly electrically coupled to the main switch control node, and the second terminal directly electrically coupled to the current sense input node such that, in operation, the main switch control node resistor resets the filter capacitor each time the main switch is turned off before a next turn-on cycle to maximize the ability of the filter capacitor to absorb a spike at the current sense input node caused by turning on the main switch during the next turn-on cycle.

5. The PCMC controller of claim 4 wherein the PCMC controller utilizes pulse width modulation (PWM) control.

6. A power converter, comprising:
a transformer having a primary winding and a secondary winding, the primary winding electrically coupleable to an input voltage node and the secondary winding electrically coupleable to an output voltage node;

a primary circuit electrically coupled to the primary winding, the primary circuit comprising a main switch;

a peak current mode control (PCMC) controller, comprising:
 a control output node electrically coupled to a main switch control node of the main switch to control the operation of the main switch;
 a current sense input node to receive a current signal indicative of a current of the main switch; and
 a current sense circuit, comprising:
  a current sense resistor electrically coupled in series with the main switch;
  a filter resistor comprising a first terminal and a second terminal, the first terminal electrically coupled to a node between the current sense resistor and the main switch, and the second terminal electrically coupled to the current sense input node;
  a filter capacitor electrically coupled to the current sense input node; and
  a main switch control node resistor comprising a first terminal and a second terminal, the first terminal directly electrically coupled to the main switch control node, and the second terminal directly electrically coupled to the current sense input node such that, in operation, the main switch control node resistor resets the filter capacitor each time the main switch is turned off before a next turn-on cycle to maximize the ability of the filter capacitor to absorb a spike at the current sense input node caused by turning on the main switch during the next turn-on cycle.

7. The power converter of claim 6 wherein the power converter is a flyback converter.

8. The power converter of claim 6 wherein the power converter is a forward converter.

9. The power converter of claim 6 wherein the power converter is a hybrid DC-DC converter or a DC-DC converter built on a printed circuit board (PCB).

10. The power converter of claim 6 wherein the power converter is a boost converter.

11. The power converter of claim 6 wherein the power converter is a buck converter.

12. The power converter of claim 6 wherein the power converter is an isolated power converter.

13. The power converter of claim 6 wherein the power converter is a non-isolated power converter.

14. The power converter of claim 6 wherein the main switch comprises a MOSFET switch, and the first terminal of the main switch control node resistor is electrically coupled to the gate of the MOSFET switch.

15. The power converter of claim 6 wherein the main switch comprises an N-channel MOSFET switch, and the first terminal of the main switch control node resistor is electrically coupled to the gate of the N-channel MOSFET switch.

* * * * *